United States Patent
Carlson et al.

(10) Patent No.: US 7,328,028 B2
(45) Date of Patent: Feb. 5, 2008

(54) METHOD AND SYSTEM FOR SENDING LOCALIZATION AND IDENTITY DEPENDENT INFORMATION TO MOBILE TERMINALS

(75) Inventors: Erik Carlson, Nesoddtangen (NO); George Fodor, Västerås (SE); Lars Gertmar, Västerås (SE); Jan-Anders Nolemo, Västerås (SE)

(73) Assignee: ABB AB, VästerUs (SE)

( * ) Notice: Subject to any disclaimer, the term of this patent is extended or adjusted under 35 U.S.C. 154(b) by 0 days.

(21) Appl. No.: 10/500,299

(22) PCT Filed: Dec. 20, 2002

(86) PCT No.: PCT/SE02/02436

§ 371 (c)(1),
(2), (4) Date: Aug. 8, 2005

(87) PCT Pub. No.: WO03/056872

PCT Pub. Date: Jul. 10, 2003

(65) Prior Publication Data

US 2006/0111122 A1    May 25, 2006

(30) Foreign Application Priority Data

Dec. 28, 2001  (SE) .................................... 0104464

(51) Int. Cl.
*H04Q 7/20* (2006.01)
*H04M 1/00* (2006.01)
*H04B 1/38* (2006.01)

(52) U.S. Cl. ................ 455/456.1; 455/456.5; 455/418; 455/423; 455/424; 455/550.1; 455/556.2; 455/566

(58) Field of Classification Search ........ 455/418–420, 455/456.1, 456.5, 456.3, 404.2, 422.1, 423–425, 455/435.1, 457, 466, 550.1, 556.2, 566, 561, 455/403, 555, 515, 41.2, 3.01, 3.05; 340/577.1, 340/577.4, 505, 42, 44, 50, 539.1, 539.11, 340/539.16, 539.18, 539.19, 539.24
See application file for complete search history.

(56) References Cited

U.S. PATENT DOCUMENTS 6,717,516 B2 *  4/2004  Bridgelall ................ 340/572.1
6,842,121 B1 *  1/2005  Tuttle ...................... 340/693.9

FOREIGN PATENT DOCUMENTS

EP     1130933 A1      9/2001
WO     WO 00/01172 A1  1/2000
WO     WO 00/04730 A1  1/2000

OTHER PUBLICATIONS

Lars Krantz; "Industrial IT . . . The Next Way of Thinking"; ABB Review; Jan. 2000; pp. 4-10.; Sweden.

* cited by examiner

*Primary Examiner*—Meless Zewdu
(74) *Attorney, Agent, or Firm*—Venable LLP; Eric J. Franklin

(57) ABSTRACT

Methods and devices for performing a selection action of information in a central system before communicating selected information to a user terminal. The selection is based on at least the identity of the user and position of the user terminal. Using relations between identity and profiles, a first information filtering can be achieved. Using relations between the actual position of the user terminal and constitution of the industrial automation facility, information irrelevant for parts in the vicinity of the user terminal is removed. The operational situation of the facility and history of user actions may be used for filtering or prioritizing the information. The most prioritized data quantity is communicated to the user terminal and displayed at a user terminal display. If all the data, despite sifting, is too extensive to be shown at once on the user terminal, the user may move between different parts of the relevant information.

33 Claims, 6 Drawing Sheets

METHOD AND SYSTEM FOR SENDING LOCALIZATION AND IDENTITY DEPENDENT INFORMATION TO MOBILE TERMINALS

TECHNICAL FIELD

The present invention relates generally to information communication in an industrial automation facility, and in particular to information communication between a central control and information system and movable user terminals.

BACKGROUND

During recent years, information technology has finally conquered also the industrial production facilities. The need for updated and rapidly accessible information is important in almost every industrial process of today. In normal operation situations, such information is crucial to allow for an optimised operation in terms of economy, reliability, quality and/or safety. Production systems are available today, which allows the customers to place their orders including all customer-defined specifications directly via Internet. A central processor system will plan the manufacturing in an optimised manner and the customer is allowed to follow the scheduling and the manufacturing processes via Internet. Such systems are based on databases accessible for the central system, which include all necessary information for automatic processing of such orders.

By integrating systems in an industrial automation facility that deals with marketing, design, manufacturing, quality, transaction processing, distribution and similar processes, the efficiency for both the customers and the manufacturers increases. Such interaction of these processes, and the systems that guide them, through the exchange of dynamic, real-time information is what now is called Industrial IT. The large benefits are achieved by the possibility of e.g. using dynamic sets for production batches with parameters associated with real-time characteristics.

Other advantages with the extensive access to updated information come in the operation of industrial facilities. Service and maintenance operations can e.g. be scheduled for causing as small production losses as possible. Moreover, also the actual service operations are facilitated by the immediate access of detailed information. Operators or service personnel having user terminals connected to a central control and information system provides the operators or service personnel with all necessary status, technical and process parameters, as well as e.g. detailed instructions how to perform certain operations. By giving the central control system access to a huge amount of information related to the industrial facility and its components, the operators and service personnel have possibility to find any relevant information through their user terminals. The benefits of such systems are particular accentuated having movable user terminals, allowing the users to move within the facility. Such ideas are e.g. presented in "Industrial IT . . . The Next Way of Thinking" by L. Krantz in ABB Review 1/2000, pp. 4-10.

However, such extensive-information systems have also some drawbacks. The basic information is often stored in different kinds of databases. When the systems get large, there is a need for either a huge communication of information, distributed databases or local replica databases. Distributed or local databases have the inherent problem of keeping the databases updated in relation to the other databases in the system. Furthermore, communicating vast amounts of information to the different user terminals requires high transmission capacity, which may be difficult to achieve in a wireless manner, at least in an industrial environment having large noise and interference sources.

In a typical industrial automation facility, time is often of crucial importance. A stand-still of an automation line may cause huge costs. A cost for a stand-still of a production line of 5-50 US dollars per second is not at all unusual today. In the light of these costs, the mean-time-to-repair (MTTR) is an important factor when non-operational conditions are present. Using Industrial IT, the actual access to relevant information is assured. However, the amount of available data may sometimes be so large that just finding the right information takes a considerable time, time which costs a lot of money. Imagine a service technician having a user terminal in the vicinity of a machine indicating an operational error. A typical sequence of actions is to log in as a user, providing user name and maybe a password, waiting for the login procedures and then find the way through the extensive database objects to find the crucial information about the machine indicating a fault. In a typical case a lot of key-pressing or mouse-handling actions have to be performed before the important information is available at all. This is particular difficult in industrial environments, where operation of keys or mice typically is slow. Solutions based on voice control are not very probable due to high noise levels in industries. Furthermore, at every action, information has to be communicated back and forth between the main system and the user terminal, which both takes time and occupies communication resources. Everyone familiar with computers of today, knows that even a relatively short waiting time may be annoying, in particular when the situation is cost and time critical.

SUMMARY

A problem with prior-art information communication systems is thus that it generally takes too long time to communicate and present relevant information at different user terminals in an industrial automation facility. Another related problem is that such communication today requires relatively large communication resources, making the communication equipment expensive.

An object of the present invention is thus to provide a communication of relevant information to a user in an industrial automation system, which is fast and which requires less communication resources than prior art systems. A further object of the present invention is to reduce the need for efforts from the user to achieve the relevant information. Another object is to reduce the need for communication resources between a central control system and user terminals.

The above objects are achieved by systems and methods according to the enclosed claims. In general words, a selection action of information is performed in the central system before communicating the selected information to the user terminal. This selection is based on at least both the identity of the user and the position of the user terminal. By using relations between identity and profiles of e.g. authority, professional knowledge, etc., a first information filtering can be achieved. In this stage, information which is not permitted for the user to see or information which is useless for the user due to lack of competence is removed. By further using relations between the position of the user terminal and the constitution of the industrial automation facility, information irrelevant for the parts in the vicinity of the user terminal is removed. Preferably, also the operational situation of the facility and the history of the user actions are used for filtering or prioritising the information. After performing the information selection, the most prioritised data quantity is communicated to the user terminal and displayed at a user terminal display. If all the data, despite the sifting, is too extensive to be shown at once on the user terminal, the user may by one or a few key presses or mouse actions zap between different parts of the relevant information. Preferably, the position of the user terminal is associated with a predetermined zone, in which the information filtering is constant. In a preferred embodiment, these predetermined zones may be different from one user to another. The position determination of the user terminal can be performed either by the user terminal itself, whereby the position subsequently is communicated to the central control and information system, or by the central system.

One advantage with the present invention is that relevant information can be presented for the user much quicker than with prior art systems. This is particularly advantageous during repair or emergency situations. Another advantage with the present invention is that the amount of data necessary to communicate between a central control system and the different user terminals is reduced significantly, which opens up for making the communication system either cheaper or more robust against disturbances.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the present invention, "industrial automation facility" is intended to comprise different kinds of industrial process facilities with a high degree of automation. The result of such a process could be a physical product, such as e.g. paper, steel, engines, consumer products and food. The facility could also be involved in producing e.g. electric energy or other non-matter products. The product of the facility could also be a motion as for instance in a transport ship. Such industrial automation facilities have in common that they normally have a certain non-negligible size. The entire facility has in a typical case an extent ranging e.g. from fifty meters up to several hundred meters. Common for such facilities is that there is a need for a flexible, preferably wireless communication between user terminals and a central control and information system.

The term "central control and information system" is in this disclosure intended to comprise a system that has access to data, knowledge and information related to a significant part of the facility. The word "central" is used for characterising the access of information, not as a characterisation of the implementation structure. The actual implementation could therefore be as a centralised unit, master/slave units, interconnected distributed units etc., as well as combinations thereof.

Figure 1:
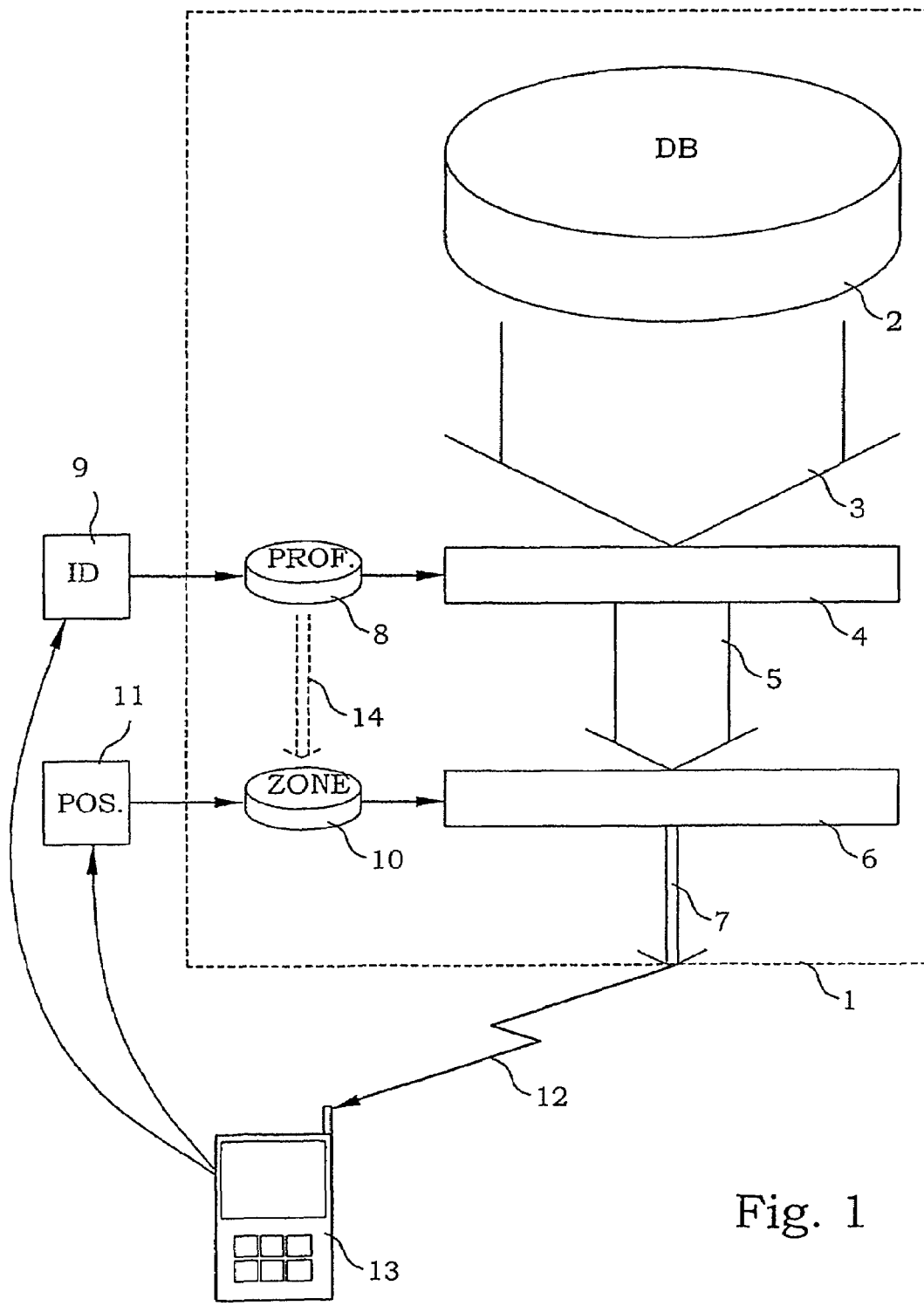
FIG. 1 is a schematic illustration of an information reduction process used according to the present invention.

In FIG. 1, a basic principle for data reduction is illustrated schematically. A central control and information system 1 comprises or has access to a database 2 comprising information about the industrial automation facility, which it serves. The database 2 comprises preferably as complete information as possible about the facility, including present and historical operational conditions, technical information regarding parts of the industrial process devices, schedules for maintenance and service, order situation, planned future production, etc. The database 2 can be one central database or a distributed database system or even access to external databases. The database 2 has a first amount of data 3 that is available for different users of the system. This first amount of data 3 is too large both to communicate to the users and to browse through in a general case.

A first selection 4 can be performed, based on the identity 9 of the user. The identity 9 can be provided to the system in different ways. If the user always uses the same user terminal 13, the relation between the user terminal 13 and the user can be provided and stored in the central control and information system itself. The user identity can then be found by retrieving this information by the central system. In other cases, where there is no one-to-one correspondence between user and user terminal, the identity has to be provided into the system in any other way. This may be performed e.g. by entering the user identity on the user terminal 13 or by e.g. inserting a smart card into the user terminal 13. The user terminal 13 may then inform the central system 1 about the relation between the user terminal and the user. The central control and information system 1 uses the identity to obtain an associated profile 8 of the user. The profiles 8 of different users are preferably stored within the central control and information system itself. The profiles 8 may comprise information about the authority of the user, i.e. what type of information he/she has the right to take part of. The profile may also comprise information about the users position in the organisation of the facility. An operator needs certain information, repair personnel need other information and directors need yet another set of information. Here, also professional qualifications and intended tasks for the employee may be entered. Someone skilled in the art of electronics has generally less use of information about complicated mechanical matter than a mechanical engineer and vice versa. This total profile of the user is used by the central control and information system to reduce the original available first data amount to a second data amount 5, which is adapted to the specific needs of the user in question.

The invention also includes a second selection 6, where the second amount of data is further reduced. This reduction is based on the information of the present position of the user terminal 13 and therefore probably also of the user. The spatial position of the user terminal 13 tells a lot of things about the present situation. A user being present in the vicinity of a certain part of the production equipment is with a high probability most interested in information related to that part. Information about other parts of the system is likely to be superfluous. Thus a mechanical engineer does not have to be drowned in information about the mechanical properties of part devices in a completely different end of the facility. The actual position determination can be made in many different ways, depending strongly on the actual communication system used. Some examples are given further below. The central control and information system 1 is provided with the position information and this information is preferably used for determining a zone 10 out of a set of predetermined zones. The zone is in turn preferably associated with a certain part of the facility apparatuses. In this way the selected zone is indicative of which information that should be prioritised to be sent to the user. A third data amount 7 results from this second selection 6, and is communicated (illustrated by the arrow 12) to the user terminal 13. By using the identity and the position of the user or user terminal 13, the most probable information for the user may be extracted from the original huge amount of data. Preferably, the extracted information is also translated into relevant knowledge easily understandable for the user. In a preferred embodiment, the division of zones may differ from one user to another, and is thus also dependent (indicated by the arrow 14) on the identity of the user.

In preferred embodiments, additional selections or prioritisations may be performed based on other information available for the central control and information system. The operation situation for the facility or parts thereof is one very useful example. If the facility is operated in a normal planned manner, there is a high probability that the relevant information has to do with normal maintenance, supervision or quality tracking actions. However, if abnormal conditions are present in the facility, either on purpose or by accident, other types of information become prioritised. If, for instance, a production unit is deliberately operated somewhat above its rated capacity, a more careful monitoring and supervision is needed. This may be the case if an increased production during a limited time is ordered and the economical benefit may compensate for any increased risk for damages on the equipment. In such a situation, service operations etc. are quite unrealistic.

Furthermore, in a situation, where any security device in the facility has indicated any more or less serious faults, the facility may have to be operated with higher safety margins or may have to be stopped completely. In all such cases, the mean time to repair is crucial, and information supporting repair and diagnosing actions should be prioritised, in particular information associated with the indicated fault and that part of the facility devices. The status of the operation of the facility is typically all systems known by the central control and information system and thus readily usable for selection of relevant information.

Also historical information can be of use. If the central control and information system keeps track of what information the different user terminals have used during the last active time, it can be used to facilitate the selection of relevant information. If e.g. an engineer performs a regular maintenance operation and is interrupted by an emergency action, it is very likely that the engineer, when the emergency situation is handled, will continue where he/she stopped, at least if he then returns to the same position as before the emergency actions. The central control and information system can then easily keep track on the history and retrieve the same information again. The central control and information system can also use the time of the day or the date as input for further limiting the information flow.

Above, the selecting of relevant information is described as a two-step operation. However, anyone skilled in the art understands that the same result easily is achieved also by combining both selecting steps in one and the same procedure.

The position of the user terminal can be obtained in many different manners.

Figure 2A:
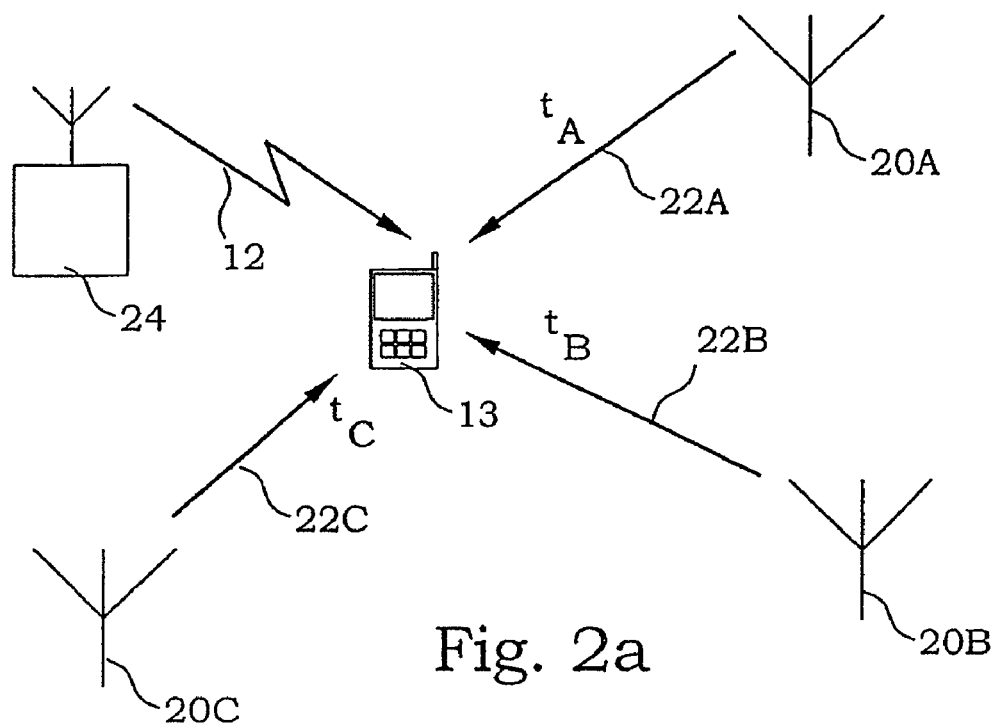
FIG. 2a is a schematic illustration of a first position determination suitable to be used in the present invention.
Figure 2B:
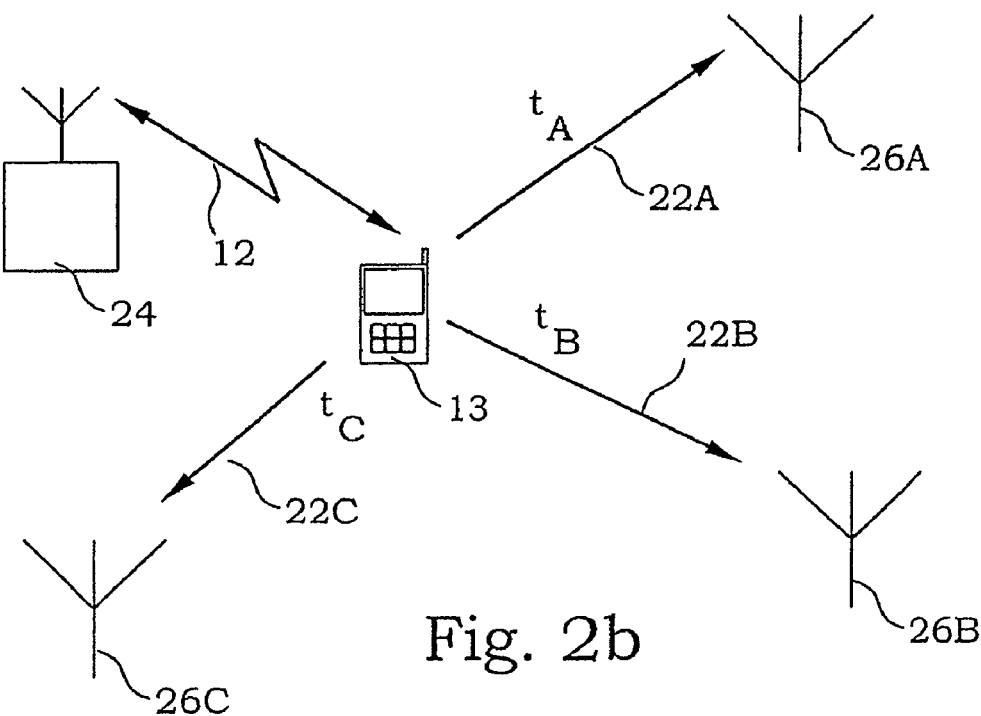
FIG. 2b is a schematic illustration of a second position determination suitable to be used in the present invention.
Figure 2C:
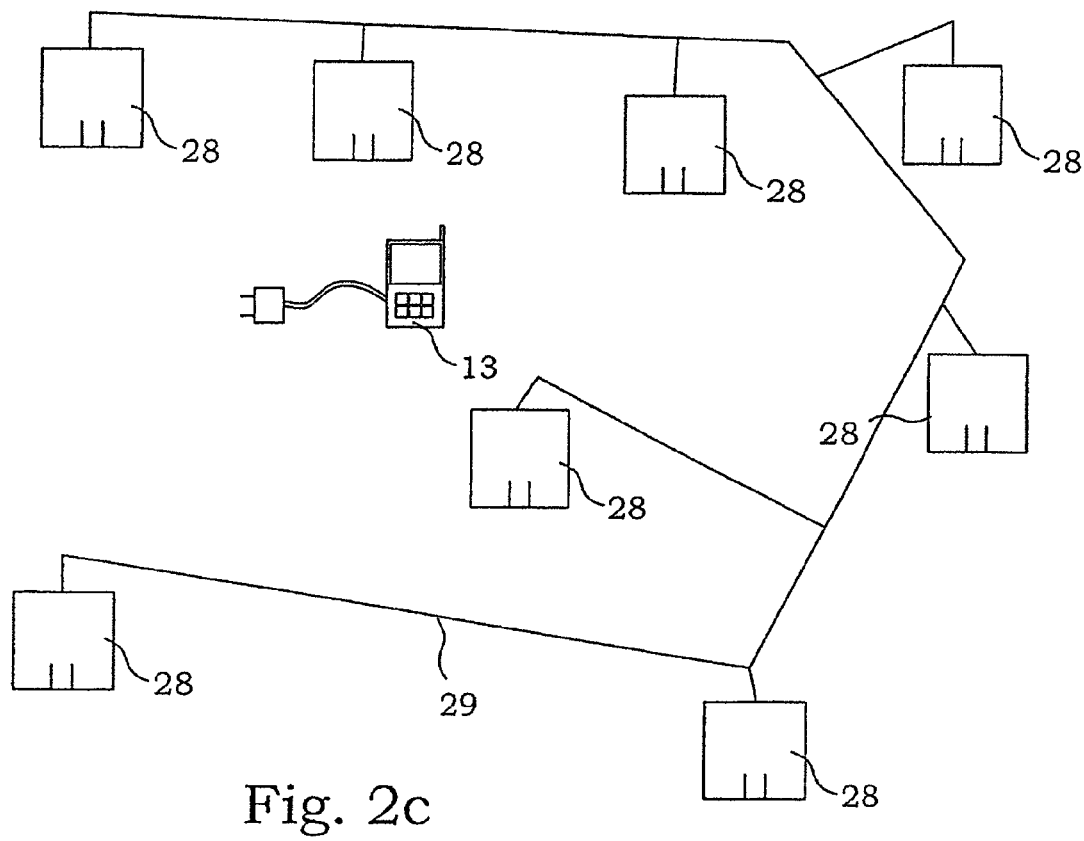
FIG. 2c is a schematic illustration of a third position determination suitable to be used in the present invention.

Many systems, part of the prior art as such, can be used in the present invention to provide the position information. In FIGS. 2a-2c, different embodiments of a locator means are illustrated. FIG. 2a illustrates a communication system, where a user terminal 13 communicates wireless with a central control and information system through a data transceiver 24. A number of transmitters 20A, 20B, 20C are distributed around the facility and are intermittently transmitting synchronised signals 22A, 22B, 22C. The user terminal receives these signals and registers the arrival times $t_A$, $t_B$, $t_C$ of the signals. The user terminal may then easily calculate its distance relative to the transmitters and by triangulation also the actual position in the facility. This position is intermittently reported to the central control and information system through the wireless connection. The actual determination of the position is thus obtained by the user terminal itself.

FIG. 2b illustrates the opposite situation. Here, the user terminal emits a certain signal, which is recorded by a number of receivers 26A-C of the central control and information system. These receivers may be the same receivers that are responsible for the transmission of data or separate ones. By also here evaluating the propagation times to the different receivers, a position of the user terminal can be calculated by the central control and information system. Here, the user terminal plays a more passive role in the determination and is only responsible for the original signal emission.

Other solutions are possible to use, depending on the actual communication system used. Direction sensitive transceivers allows for determination using fewer units, and the existence of a reliable time synchronisation between the user terminal and the central control and information system opens up for other possibilities.

Solutions based on other techniques than the wireless emission used for data communication are also possible to use for determining the position of the user terminal.

One implementation of movable terminals, illustrated in FIG. 2c, is the use of a network 29 of stationary connection blocks 28, distributed over the facility area to critical positions. Movable user terminals 13 can then be connected to any of these stationary connection blocks 28. The act of connecting the user terminal 13 will in such a case form the basis of the position determination. When a user terminal 13 is connected, the central control and information system will discover this connection and identify the connected user terminal 13, e.g. by investigating an identity of the user terminal 13 available e.g. as a smart card included in the terminal. The central control and information system has furthermore information about the actual design of the network 29 of stationary connection blocks 28 and will correlate the user terminal to a certain position by this information. The position determination is thereby performed without any actions from the user.

Figure 3:
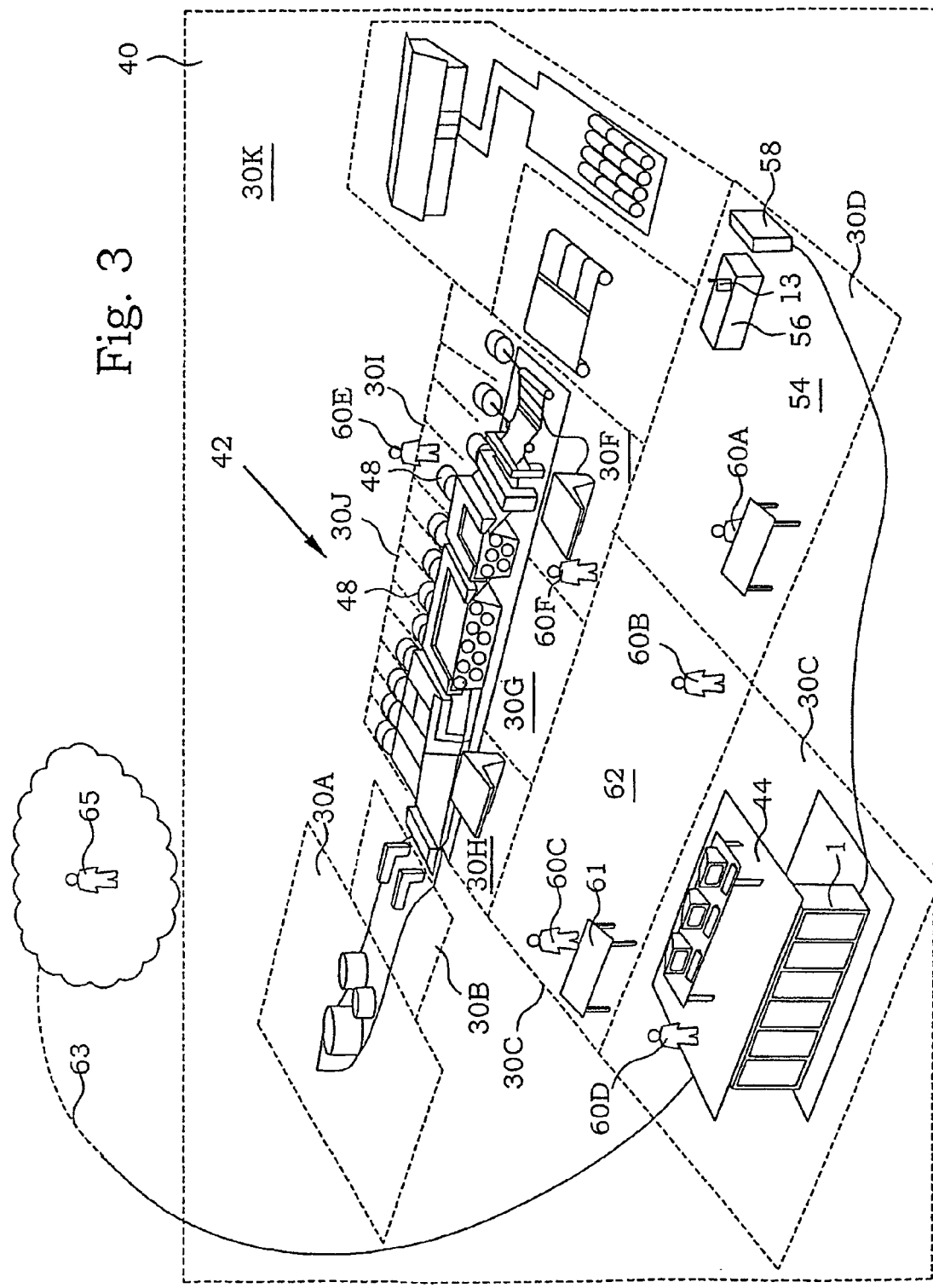
FIG. 3 is a schematic drawing of a paper production facility having an information communication system according to the present invention.

In order to give a feeling of the various advantages and possibilities with the present invention, a few examples will be given here below. A first example is illustrated in FIG. 3. A paper production facility 40 comprises a paper production line 42. Pulp is entering at one side and resulting paper products are provided at the end side of the production line 42. The production line is only schematically illustrated and described, since the actual paper production procedures have only small influence on the present invention. The area within the facility 40 is divided in different zones 30A-30K. Note that only some zones have reference numbers in order to increase the readability of the figure. The zone 30A enclose the arrival zone of the paper pulp, zone 30B corresponds to the devices for introducing the pulp into the C actual paper machine. The central paper machine comprises a number of motors 48, each one associated with a separate zone 30I. The entire process is controlled and monitored with a central control and information system 1, and control information is continuously presented at monitors in a control room 44. The control room is also associated with a zone 30C. A number of people 60A-60E are presently working within the facility. Most people working in the facility have access to a user terminal, which is wireless connected to the central control and information system. The system also comprises means for determining the position of the different user terminals.

Here below a fictive course of events will be described, illustrating different aspects of the communication system. An electrical engineer arrives at the facility 40 and enters a personnel area 54, corresponding to a zone 30D. The electrical engineer report his presence by a time manager system 58 connected to the central control and information system 1. The electrical engineer has his own personal user terminal, which during his absence is stored and charged in a terminal home station 56. When the electrical engineer reports his presence by the time manager system 58, the central control and information system 1 activates the personal user terminal of the electrical engineer, and the user terminal is ready to use, when the electrical engineer has collected his normal working equipment. The last thing the electrical engineer did the previous day was to initiate a calibration of some measurement devices, which are to be used in the production line 42 within a few days. When the electrical engineer enters a workshop 62, associated with a zone 30E, the central control and information system 1 selects the latest used information of the previous day to display on the user terminal. When the electrical engineer reaches his test bench 61 in the workshop, relevant information about the calibration status is shown at the user terminal and the calibration procedure can immediately be resumed without any further actions from the electrical engineer.

At the production line 42, a paper quality test equipment 52 is provided. The test equipment is connected to a quality monitoring desk 53, situated in a zone 30F. A quality engineer 60F checks the results from the last hours and discovers a minor peculiarity of one of the sensors. This peculiarity does not immediately call for any emergency actions, but the quality engineer uses his user terminal to search for information about the particular sensor in order to find any plausible reasons for the behaviour. Since he is situated in the quality monitoring zone 30F, the information about the sensor is readily accessible by pressing just a few keys, since the central control and information system 1 already has selected the information about the sensor as a probably high-prioritised information. The quality engineer quickly finds out that the peculiarities most probably are caused by contact oxidation in the sensor. Subsequently, the quality engineer calls for assistance from an electrical engineer to repair the sensor. An operation situation of the facility, where an electrical engineer is needed at the quality desk, without emergency status has occurred. According to the working schedule of the facility, one electrical engineer is assigned as the primary assistance engineer each day. The central control and information system looks for this assigned assistance engineer, but finds out that he and his user terminal presently is positioned in zone 30D, i.e. the personnel area, probably having his lunch break. Since the call for assistance was not an emergency call, the central control and information system 1 instead searches for any other electrical engineer with the right competence profile in the vicinity of the quality desk, and finds that the electrical engineer 60C performing the calibrations is the most suitable one. Taking advantage of the knowledge of the competence profile, position and the operation situation of the facility, the central control and information system 1 makes a new selection of data that is going to be presented at the user terminal of the electrical engineer 60C. Subsequently, he gets a message that he is requested to go to the quality desk and informed to bring tools and other equipment for restoring an oxidised contact in a sensor. The detailed information about the sensor is now made easily available for the electrical engineer, by just pressing a few keys. The sensor is restored and normal operation is resumed.

At a later occasion, a control engineer 60D supervising the monitors of the control room 44, gets an alarm signal from one of the motors 48, situated in zone 30J. A critical temperature has increased rapidly and a temperature watch has alerted the alarm. The operator calls for an emergency control of a mechanical engineer. The central control and information system 1 knows that a mechanical engineer 60E is present in a neighboring zone 30I and transmits new information to him. The mechanical engineer is in position within a few seconds and has all relevant data readily available at his user terminal without any own actions. He discovers a major fault and reports this to the control engineer 60D, which immediately decides to stop the production line 42. The mechanical engineer 60E investigates the consequences of the major fault. He notices some damages and asks for replacement parts. However, these parts are not available at the production facility and have to be transported from somewhere else. According to information that the engineer has available at his user terminal he, however, realises that the motor may still be operable to some extent. In order to confirm this, a specialist 65 has to be contacted. Unfortunately, the specialist 65 is on vacations, but can be contacted via an Internet link 63. Relevant data is sent to the specialist 65, which soon confirms that the motor can be used, but at a reduced speed.

When the production line was stopped, the production manager of the facility was immediately informed. The present scheduling of production is presented at his user terminal together with the present status of the operation, i.e. an emergency stop. He starts to investigate possible rescheduling, dependent on the duration of the stop. When the specialist 65 approves operation of the motor at a reduced speed, the production manager can easily retrieve from the central control and information system 1 that the present paper quality can not be produced. However, another paper quality can be produced using the failing motor at a reduced speed. The production manager gives order about an immediate change of paper quality and the production is slowly resumed. Due to the fact that relevant information was available at the right places at the right time and in a fast manner, the duration of the stop was minimised.

The replacement parts were going to arrive two days later and a planned production line stop was scheduled one further day later. The economical losses were in this manner reduced significantly.

Figure 4:
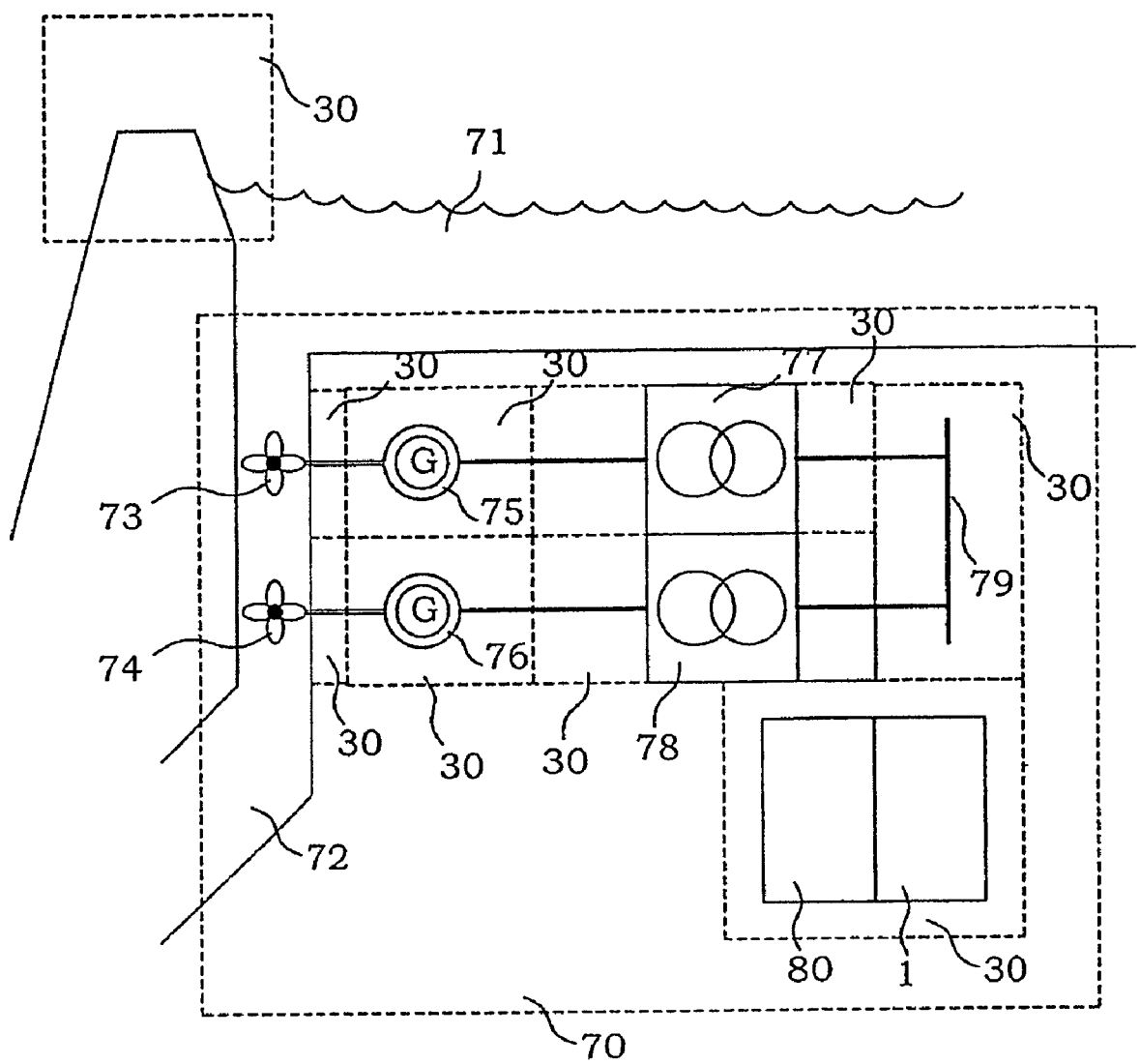
FIG. 4 is a schematic drawing of an electric power plant having an information communication system according to the present invention.

FIG. 4 illustrates another industrial automation facility in which the present invention may be used. An electric power plant 70 for hydroelectric power involves a reservoir 71 for water and an outlet path 72, in which two turbines 73, 74 are placed. Each of the turbines 73, 74 are connected to generators 75, 76 for production of electric energy. The generators 75, 76 are in turn connected to transformers 77, 78 and further to an electric distribution grid 79. The different objects in the power plant are supervised and monitored from a control room 80. A central control and information system 1 has access to all operational information as well as technical, calibration and test data information about the different devices of the plant 70. Each device has an associated zone 30, and so does the control room. Another zone may e.g. be defined at the reservoir for e.g. inspection purposes. As in the example above, user terminals are available, which communicate wireless with the central control and information system.

A maintenance stop is planned at the power plant for replacing parts of the generator 76. The stop has to be performed within a day or two for avoiding damages on other equipment. At the time for the shut-down, another power plant has to be shut down, and if also one of the turbines of the present plant is stopped, a lack of power in the distribution network arises. The managers of the power plant is asked to consider running the remaining generator at a power over the rated one, for a short period. The management accepts this, but since many people are involved in the maintenance labour, only a few people are available for running the overpowered generator. In order to allow an overpower, a continuous direct visible inspection has to be performed and observations have to be correlated directly with the instantaneous operation conditions. In a system according to prior art, this would have been troublesome. In this case, a few persons may patrol the plant part in operation. When the persons came close to an object, the central control and information system 1 selects relevant data for this object without any need for extensive communication procedures between the user and the central control and information system. A smaller number of people can then manage to control the system. The data is continuously updated and if questions arise, specialists working on the replacement work can easily be consulted. Due to the data filtering dependent both on user identity and position, the information flow is rapidly and precisely made available.

Figure 5:
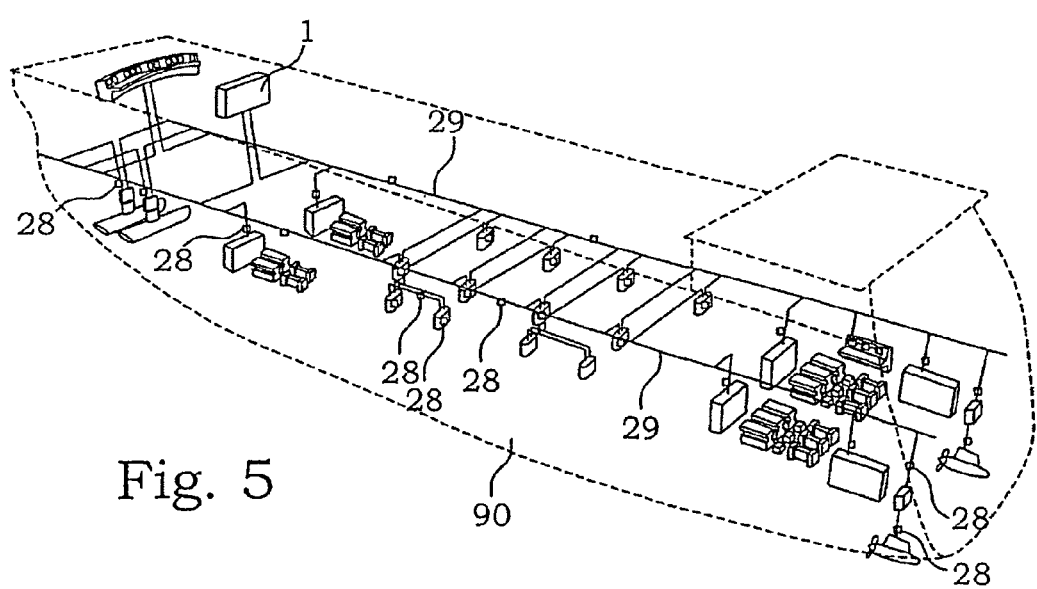
FIG. 5 is a schematic drawing of a ship having an information communication system according to the present invention.

A third example is illustrated in FIG. 5. Here the industrial automation facility is a cargo ship 90. The ship is provided with a central control and information system and a network of connection blocks. It is thus possible to connect a user terminal to any of these blocks for retrieving information. The operation of the ship is performed based on many inputs, such as the position of the ship, power generation and energy optimisation of the engines, weather forecasts, safety instructions etc. The importance of access to updated relevant information based on the knowledge of the position of the person who requests the information is obvious.

The above examples have been discussed starting from the existence of movable user terminals. Of course, the use of movable terminals may be combined with the use of stationary terminals as well. A similar information flow filtering can be performed also for these terminals. However, the information about the position does not change and a stationary selection of information can be performed in advance. Many of the advantages do not appear in systems having only stationary terminals, but mixed systems are possible.

Furthermore, even if the present invention provides for showing the most probable relevant information on the user terminals without any actions from the user, there are of course situations, where the user has to actively make choices about which information should be displayed. The selection of information based on the zone or position information can thus be overridden. However, by reducing the amount of information, the choices can be performed rapidly with pressing just a few buttons or keys. The user terminal can in such a way be used for zapping between different blocks of relevant information.

Figure 6:
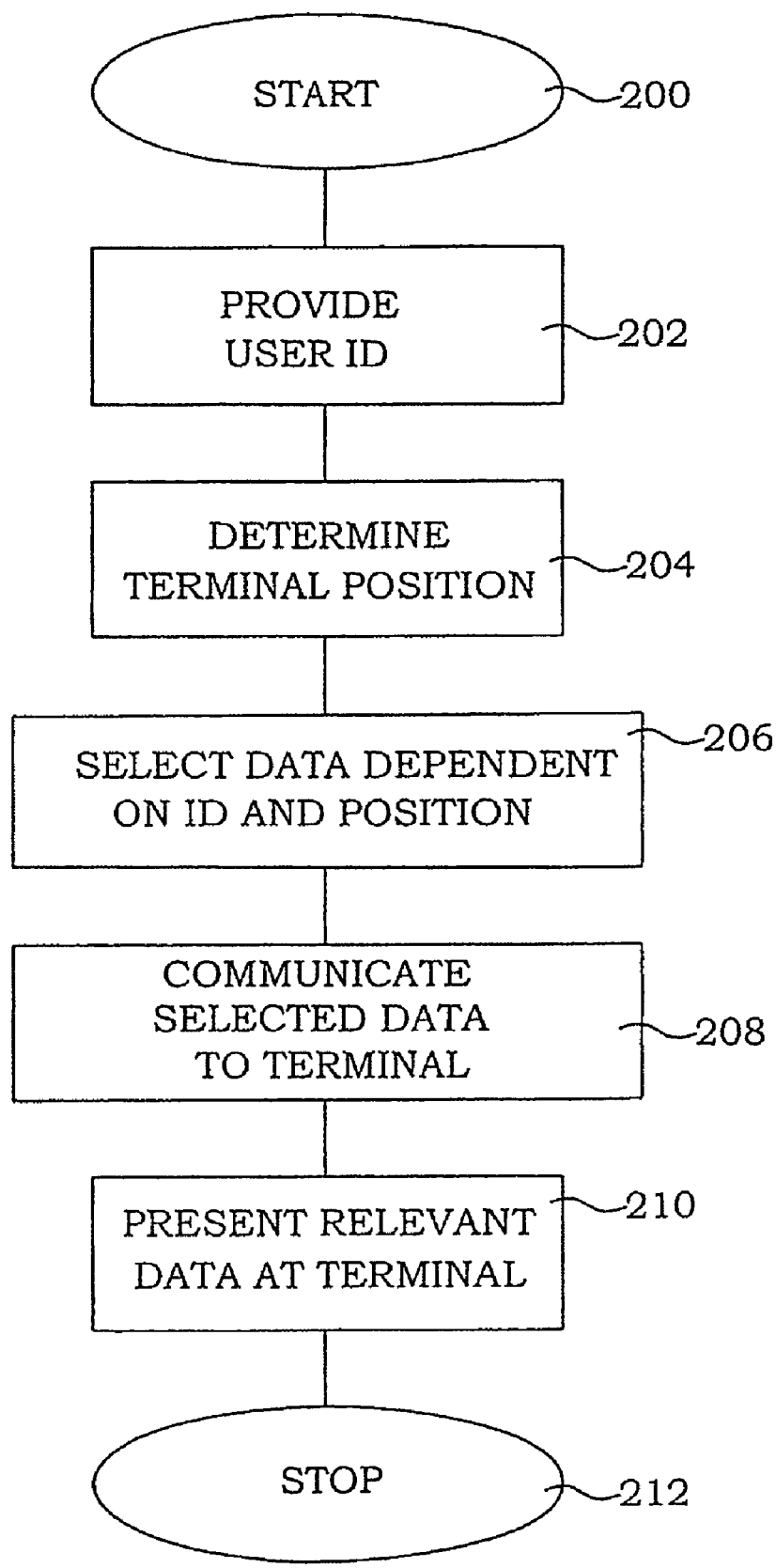
FIG. 6 is a block diagram of a communication method according to the present invention.

FIG. 6 presents a flow diagram illustrating main steps of a method according to the present invention. The procedure starts in step 200. In step 202, an identity of the user is provided to a central control and information system. The position of a user terminal is determined in step 204, either by the central control and information system or by the user terminal itself, followed by a transfer of the position information to the central control and information system. Based on both the identity and the position, a data quantity is selected in step 206 from available data sources to represent relevant data for the user. In step 208, this selected data is communicated to the user terminal and the relevant data is displayed at the terminal in step 210. The procedure ends in step 212.

The methods according to the present invention may be implemented as software, hardware, or a combination thereof. A computer program product implementing the method or a part thereof comprises a software or a computer program run on a general purpose or specially adapted computer, processor, microprocessor or programmable logic controller (PLC). The software includes computer program code elements or software code portions that make the computer perform the method using at least one of the steps previously described in FIG. 6. The program may be stored in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, or on a data server. Such a computer program product can also be supplied via a network, such as Internet.

The user terminals can be of many different kinds. In a typical case, the user terminal is a portable computer or a handheld computer with facilities for C communication with the central control and information system. In certain cases, the terminals may be specially manufactured for the intended use or at least provided with protection means in order to be possible to use in a contaminating environment. For applications, where a very limited amount of data is to be shown, mobile telephones are plausible to use. It is also possible to mix different types of terminals within one and the same facility, adapting the complexity of the terminal to the expected data load.

One interesting application of the present invention is as a tool for education. When educating a new employee about every relevant detail of a industrial automation facility, it may be very useful to have support from a user terminal, that selects relevant instruction information during a visit in the vicinity of the different devices. The selection of information can then be performed in a pedagogic, carefully prepared manner.

It will be understood by those skilled in the art that various modifications and changes may be made to the present invention without departure from the scope thereof, which is defined by the appended claims.

The invention claimed is:

1. A communication method in an industrial automation facility, having a central control and information system and a number of movable user terminals having an information display, and where the control and information system has access to data bases comprising extensive information of the industrial automation facility, the method comprising:
providing said central control and information system with an identification of a user of a first user terminal;
determining a present location of said first user terminal, wherein determining the location comprises relating the location of the first user terminal to a zone of a predetermined spatial extent;
selecting a data quantity from the databases depending on at least both the user identification and the present location; and whereby selecting the data quantity depends upon the identity of the zone of the predetermined spatial extent;
where the selected data quantity forms a reduced part of the extensive information about the industrial automated facility, adapted to the users specific needs;
communicating said data quantity from the central control and information system to the first user terminal; and
presenting first data quantity for said user on the information display of the first user terminal,
whereby the user is provided with most relevant facility information at each instant without taking active measures.

2. The communication method according to claim 1, wherein the selecting step is dependent also on at least one of
the history of communication to and from said first user terminal,
the operational situation of said industrial facility, time, and
date.

3. The communication method according to claim 1, further comprising:
the user inputting data to the first user terminal; and
communicating the inputted data to said central control and information system;
whereby said selecting step being dependent also on the inputted data.

4. The communication method according to claim 3, wherein the inputted data is representative of a predetermined activity of the user.

5. The communication method according to claim 4, wherein the predetermined activity is selected from a list of
maintenance;
supervision; and
education.

6. The communication method according to claim 1, wherein communication to and from the first user terminal is performed wirelessly.

7. The communication method according to claim 6, wherein the location determining step is performed in the first user terminal, and by the further step of communicating data representing the determined location to said central control and information system.

8. The communication method according to claim 6, wherein the location determining step is performed in the central control and information system.

9. The communication method according to claim 1, wherein the communication to and from the first user terminal is performed via stationary connection blocks.

10. The communication method according to claim 9, wherein the location determining step comprises:
determining which stationary connection block the first user terminal is connected to; and
relating the determined stationary connection block to a physical location by a predetermined database.

11. The communication method according to claim 1, wherein the predetermined spatial extent of said zone is dependent on said user identification.

12. The communication method according to claim 1, wherein the selected data quantity comprises operational data of the industrial automation facility.

13. The communication method according to claim 1, further comprising communicating data to and/or from stationary user terminals.

14. The communication method according to claim 1, further comprising communicating data to and/or from external networks.

15. The communication method according to claim 1, further comprising relating the user identification to at least one of:
authorization profile;
education profile;
organization position; and
priority.

16. A communication system in an industrial automation facility, comprising:
a central control and information system;
a number of movable user terminals having an information display; and
identification providing means for providing said central control and information system with an identification of a user of a first user terminal;
whereby the central control and information system having access to at least one database,
whereby the database comprises extensive information about the industrial automation facility,
locator means for determining a present location of the first user terminal, wherein the locator means comprises means for relating the first user terminal to a zone of a predetermined spatial extent;
selector means for selecting a data quantity from said database, whereby selector means is connected to at least both said identification providing means and the locator means and has access to an identity of the zone of the predetermined spatial extent;
whereby the selected data quantity comprises a reduced part of the extensive information about the industrial automation facility, adapted to the users specific need; and
communication means for communicating the selected data quantity from said selector means to the first user terminal;
whereby the information display of the first user terminal being arranged for presenting the selected data quantity for the user;
whereby said user is provided with most relevant facility information at each instant without taking active measures.

17. The communication system according to claim 16, wherein the selector means has access to additional information selected from a list of:
a history of communication to and from the first user terminal;
an operational situation of said industrial facility; time; and date.

18. The communication system according to claim 16, wherein the first user terminal further comprises means for inputting data and in that the communication means is arranged also for communicating data from said first user terminal to the central control and information system, whereby the selector means has an access to at least a part of the data from said first user terminal.

19. The communication system according to claim 18, wherein the inputted data is representative of a predetermined activity of the user.

20. The communication system according to claim 19, wherein the predetermined activity is selected from a list of:
   maintenance;
   supervision; and
   education.

21. The communication system according to claim 16, wherein the communication means is a wireless communication means.

22. The communication system according to claim 21, wherein the first user terminal comprises the locator means, the communication means being arranged to communicate data representing the determined location to the central control and information system.

23. The communication system according to claim 21, wherein the central control and information system comprises said locator means.

24. The communication system according to claim 16, wherein the communication means comprises wires connected via stationary connection blocks.

25. The communication system according to claim 24, wherein the locator means in turn comprises:
   means for determining which stationary connection block the first user terminal is connected to; and
   means for relating the determined stationary connection block to a physical location by a predetermined database.

26. The communication system according to claim 16, wherein the predetermined spatial extent of said zone is dependent on said user identification.

27. The communication system according to claim 16, wherein the selected data quantity comprises operational data of the industrial automation facility.

28. The communication system according to claim 16, wherein the communication means is further arranged for communicating data to and/or from stationary user terminals.

29. The communication system according to claim 16, wherein the communication means is further arranged for communicating data to and/or from external networks.

30. The communication system according to claim 16, wherein the database comprises means for relating said user identification to at least one of:
   an authorization profile;
   an education profile;
   an organization position; and
   a priority.

31. A computer program products, comprising:
   a computer readable medium; and
   computer code means and/or software code portions recorded on the computer readable medium and executable by a process for performing a method for communication in an industrial automation facility, having a central control and information system and a number of movable user terminals having an information display, and where the control and information system has access to data bases comprising extensive information of the industrial automation facility, the method comprising:
   providing said central control and information system with an identification of a user of a first user terminal;
   determining a present location of said first user terminal, wherein determining the location comprises relating a location of the first user terminal to a zone of a predetermined spatial extent;
   selecting a data quantity from the databases depending on at least both the identification and the present location, whereby selecting the data quantity depends upon the identity of the zone of the predetermined spatial extent;
   where the selected data Quantity forms a reduced part of the extensive information about the industrial automated facility, adapted to the users specific needs,
   communicating said data quantity from the central control and information system to the first user terminal; and
   presenting the first data quantity for said user on the information display of the first user terminal;
   whereby the user is provided with most relevant facility information at each instant without taking active measures.

32. The computer program product according to claim 31, wherein the computer program instructions are further used for supplying the computer program instructions via a network.

33. The computer program product according to claim 31, wherein the computer program instructions are further used for supplying the computer program instructions via the Internet.

* * * * *